Patented Mar. 28, 1944

2,344,997

UNITED STATES PATENT OFFICE 2,344,997

3-DERIVATIVES OF THE SATURATED AND UNSATURATED ANDROSTANE-3-ONE-17-OLS SUBSTITUTED IN 17-POSITION AND PROCESS OF MAKING SAME AS WELL AS THE CORRESPONDING FREE KETONES

Karl Miescher, Riehen, Switzerland, assignor, by mesne assignments, to Ciba Pharmaceutical Products, Incorporated, Summit, N. J., a corporation of New Jersey No Drawing. Application November 25, 1939, Serial No. 306,184. In Switzerland December 10, 1938

15 Claims. (Cl. 260—397.5)

It is known that saturated and unsaturated androstanolones containing a substituent, for example a saturated or unsaturated hydrocarbon radical, in the 17-position and a keto group in the 3-position, may be obtained by treating corresponding 3-oxy compounds with oxidizing agents. Such a final oxidation, however, has shown itself in many cases to be undesirable. It has now been found that it may be avoided if metallo-organic compounds are allowed to react on 3-enolates or 3-acetals of saturated or unsaturated androstandiones, and, if required, the derivatives thus obtained are hydrolyzed.

As parent substances, for example the 3-enol ethers, like 3-methyl- or 3-ethyl-enol ethers as well as the 3-enol esters and the 3-acetals, for example the 3-glycolates or 3-propandiolates, of androstendiones or androstandiones or their derivatives may be used. These can be prepared according to the data of the publication of A. Serini and H. Klöster in "Berichte der deutschen chemischen Gesellschaft," vol. 71, page 1766 (1938).

Suitable metallo-organic compounds are, for example, the magnesium organo compounds, such as alkyl- (like methyl-, ethyl-), alkylene- (like allyl-), aralkyl- (like benzyl-) or aryl- (like phenyl-) magnesium halides, further zinc-alkyl compounds and the like.

As products of the present invention there may be named for example the 3-derivatives like 3-enolates (3-enolethers or -esters) or 3-acetals of the saturated and unsaturated androstane-3-one-17-ols containing in 17-position saturated hydrocarbon radicals like alkyl groups (methyl, ethyl groups) or hydrocarbon radicals containing double bonds like allyl- or benzyl-groups. Furthermore their hydrolyzing products containing free 3-keto-groups are also obtained.

*Example*

A solution of 63 gms. of androstendione-3-mono-enol-ethylether in toluene is allowed to drop into an ethereal solution of 72 gms. of methyl-magnesium bromide. The mixed solutions are then boiled for some time. After the reaction is complete, the solution is decomposed with excess of ammonium chloride solution and the layers are separated. The 3-enol ether of the 17-methyl-testosterone is obtained after concentration of the organic solution and may easily be converted by an acid agent into the known 17-methyl-testosterone. In an analogous manner also the 17-ethyl-, -allyl-, or -benzyl-testosterones are obtained. The corresponding Grignard-reagents may be replaced for example by zinc derivatives.

Instead of the androstendione-3-mono-enol-ethylether one may start also from other androstendione 3-mono-enolethers, for example the methyl-, propyl-, benyl- or trityl-ethers or even from corresponding 3-mono-enolesters or -acetals.

The 17-methyl-dihydro-testosterone, for example, may be obtained in a similar manner for example from the 3-glycolacetal, other 3-mono-acetals, 3-mono-enolethers or -esters of androstandione.

The alcohols epimeric in 17-position may also be separated from the mother liquors of the reaction product.

What I claim is:

1. Process for the manufacture of saturated and unsaturated androstanolones substituted in 17-position and derivatives thereof, comprising allowing metallo-organic compounds of Grignard type containing a metal of the group consisting of magnesium and zinc to react on a member of the group consisting of 3-enol ethers, 3-enol esters and 3-acetals of saturated and unsaturated androstandiones.

2. Process for the manufacture of saturated and unsaturated androstanolones substituted in 17-position and derivatives thereof, comprising allowing metallo-organic compounds of Grignard type containing a metal of the group consisting of magnesium and zinc to react on a member of the group consisting of 3-enol ethers, 3-enol esters and 3-acetals of saturated and unsaturated androstandiones, and then hydrolizing the derivatives obtained.

3. Process for the manufacture of saturated and unsaturated androstanolones substituted in 17-position and derivatives thereof, comprising allowing saturated metallo-organic compounds of Grignard type containing a metal of the group consisting of magnesium and zinc to react on a member of the group consisting of 3-enol ethers, 3-enol esters and 3-acetals of saturated and unsaturated androstandiones, and then hydrolizing the derivatives obtained.

4. Process for the manufacture of saturated and unsaturated androstanolones substituted in 17-position and derivatives thereof, comprising allowing alkyl-metallo-organic compounds of Grignard type containing a metal of the group consisting of magnesium and zinc to react on a member of the group consisting of 3-enol ethers, 3-enol esters and 3-acetals of saturated and unsaturated androstandiones, and then hydrolizing the derivatives obtained.

5. Process for the manufacture of saturated and unsaturated androstanolones substituted in 17-position and derivatives thereof, comprising allowing methyl-magnesium halides to react on a member of the group consisting of 3-enol ethers, 3-enol esters and 3-acetals of saturated and unsaturated androstandiones, and then hydrolizing the derivatives obtained.

6. Process for the manufacture of saturated and unsaturated androstanolones substituted in 17-position and derivatives thereof, comprising allowing metallo-organic compounds of Grignard type containing double bonds and a metal of the group consisting of magnesium and zinc to react on a member of the group consisting of 3-enol ethers, 3-enol esters and 3-acetals of saturated and unsaturated androstandiones, and then hydrolizing the derivatives obtained.

7. The 3-enolethers of the saturated and unsaturated androstane-3-one-17-ols containing in 17-position a member of the group consisting of saturated hydrocarbon radicals and hydrocarbon radicals containing double bonds.

8. The 3-enolethers of the saturated and unsaturated androstane-3-one-17-ols containing in 17-position an alkyl group.

9. The 3-enolethers of the saturated and unsaturated androstane-3-one-17-ols containing in 17-position a methyl group.

10. Process for the manufacture of saturated and unsaturated androstanolones substituted in 17-position and derivatives thereof, comprising allowing metallo-organic compounds of Grignard type containing a metal of the group consisting of magnesium and zinc to react on 3-enol ethers of saturated and unsaturated androstandiones.

11. Process for the manufacture of saturated and unsaturated androstanolones substituted in 17-position and derivatives thereof, comprising allowing metallo-organic compounds of Grignard type containing a metal of the group consisting of magnesium and zinc to react on 3-enol ethers of saturated and unsaturated androstandiones, and then hydrolizing the derivatives obtained.

12. Process for the manufacture of saturated and unsaturated androstanolones substituted in 17-position and derivatives thereof, comprising allowing saturated metallo-organic compounds of Grignard type containing a metal of the group consisting of magnesium and zinc to react on 3-enol ethers of saturated and unsaturated androstandiones, and then hydrolizing the derivatives obtained.

13. Process for the manufacture of saturated and unsaturated androstanolones substituted in 17-position and derivatives thereof, comprising allowing alkyl-metallo-organic compounds of Grignard type containing a metal of the group consisting of magnesium and zinc to react on 3-enol ethers of saturated and unsaturated androstandiones, and then hydrolizing the derivatives obtained.

14. Process for the manufacture of saturated and unsaturated androstanolones substituted in 17-position and derivatives thereof, comprising allowing methyl-magnesium halides to react on 3-enol ethers of saturated and unsaturated androstandiones and then hydrolizing the derivatives obtained.

15. Process for the manufacture of saturated and unsaturated androstanolones substituted in 17-position and derivatives thereof, comprising allowing metallo-organic compounds of Grignard type containing double bonds and a metal of the group of magnesium and zinc to react on 3-enol ethers of saturated and unsaturated androstandiones, and then hydrolizing the derivatives obtained.

KARL MIESCHER.